US011710303B2

(12) United States Patent
Haynes

(10) Patent No.: US 11,710,303 B2
(45) Date of Patent: *Jul. 25, 2023

(54) SYSTEMS AND METHODS FOR PRIORITIZING OBJECT PREDICTION FOR AUTONOMOUS VEHICLES

(71) Applicant: UATC, LLC, Mountain View, CA (US)

(72) Inventor: Galen Clark Haynes, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/408,728

(22) Filed: Aug. 23, 2021

(65) Prior Publication Data

US 2021/0382488 A1 Dec. 9, 2021

Related U.S. Application Data

(63) Continuation of application No. 16/211,376, filed on Dec. 6, 2018, now Pat. No. 11,099,569, which is a
(Continued)

(51) Int. Cl.
*G06V 10/82* (2022.01)
*G06N 20/00* (2019.01)
(Continued)

(52) U.S. Cl.
CPC .......... *G06V 10/82* (2022.01); *B60W 30/095* (2013.01); *B60W 30/0956* (2013.01);
(Continued)

(58) Field of Classification Search
CPC .. G05D 1/0212; G05D 1/0088; G05D 1/0221; G05D 1/0231; G05D 1/0257;
(Continued)

(56) References Cited

U.S. PATENT DOCUMENTS 7,899,621 B2 3/2011 Breed et al.
8,126,642 B2 2/2012 Trepagnier et al.
(Continued)

FOREIGN PATENT DOCUMENTS

CN 105358397 A 2/2016
CN 106428009 A 2/2017
(Continued)

OTHER PUBLICATIONS

Machine Translated Chinese Search Report for Application No. 201880061470 dated Oct. 26, 2022, 2 pages.
(Continued)

*Primary Examiner* — Alan D Hutchinson
(74) *Attorney, Agent, or Firm* — Dority & Manning, P.A.

(57) ABSTRACT

Systems and methods for determining object prioritization and predicting future object locations for an autonomous vehicle are provided. A method can include obtaining, by a computing system comprising one or more processors, state data descriptive of at least a current or past state of a plurality of objects that are perceived by an autonomous vehicle. The method can further include determining, by the computing system, a priority classification for each object in the plurality of objects based at least in part on the respective state data for each object. The method can further include determining, by the computing system, an order at which the computing system determines a predicted future state for each object based at least in part on the priority classification for each object and determining, by the computing system, the predicted future state for each object based at least in part on the determined order.

20 Claims, 5 Drawing Sheets

Related U.S. Application Data continuation of application No. 15/811,865, filed on Nov. 14, 2017, now Pat. No. 10,216,189.

(60) Provisional application No. 62/549,407, filed on Aug. 23, 2017.

(51) Int. Cl.
| | | |
|---|---|---|
| *G05D 1/02* | (2020.01) | |
| *G05D 1/00* | (2006.01) | |
| *B60W 30/095* | (2012.01) | |
| *G08G 1/01* | (2006.01) | |
| *B60W 40/00* | (2006.01) | |
| *G06V 10/764* | (2022.01) | |
| *G06V 20/58* | (2022.01) | |
| *G06T 7/70* | (2017.01) | |

(52) U.S. Cl.
CPC .......... *B60W 40/00* (2013.01); *G05D 1/0088* (2013.01); *G05D 1/0212* (2013.01); *G05D 1/0221* (2013.01); *G06N 20/00* (2019.01); *G06T 7/70* (2017.01); *G06V 10/764* (2022.01); *G06V 20/58* (2022.01); *G08G 1/0112* (2013.01); *B60W 2554/00* (2020.02); *G05D 1/0231* (2013.01); *G05D 1/0257* (2013.01); *G05D 2201/0213* (2013.01); *G08G 1/0129* (2013.01); *G08G 1/0133* (2013.01)

(58) Field of Classification Search
CPC ........ G05D 2201/0213; B60W 30/095; B60W 30/0956; B60W 40/00; B60W 2554/00; B60W 50/06; B60W 2050/065; B60W 2554/402; B60W 60/00276; G06N 20/00; G06T 7/70; G08G 1/0112; G08G 1/0129; G08G 1/0133; G06V 10/82; G06V 20/58; G06V 10/764
See application file for complete search history.

(56) References Cited

U.S. PATENT DOCUMENTS

| | | |
|---|---|---|
| 8,605,947 B2 | 12/2013 | Zhang et al. |
| 8,767,186 B2 | 7/2014 | Lu et al. |
| 9,164,511 B1 | 10/2015 | Ferguson et al. |
| 9,302,678 B2 | 4/2016 | Murphy et al. |
| 9,373,149 B2 | 6/2016 | Abhyanker |
| 9,381,917 B1 | 7/2016 | Dolgov et al. |
| 9,440,647 B1 | 9/2016 | Sucan et al. |
| 9,561,797 B2 | 2/2017 | Dolgov et al. |
| 9,934,688 B2 | 4/2018 | Olson et al. |
| 10,077,054 B2 | 9/2018 | Halder et al. |
| 2009/0268946 A1 | 10/2009 | Zhang et al. |
| 2010/0328644 A1 | 12/2010 | Lu et al. |
| 2014/0330479 A1 | 11/2014 | Dolgov et al. |
| 2017/0031361 A1 | 2/2017 | Olson et al. |
| 2017/0120804 A1 | 5/2017 | Kentley et al. |
| 2017/0120902 A1 | 5/2017 | Kentley et al. |
| 2018/0032082 A1 | 2/2018 | Shalev-Shwartz et al. |
| 2018/0136654 A1 | 5/2018 | Kently-Klay et al. |

FOREIGN PATENT DOCUMENTS

| | | |
|---|---|---|
| CN | 106504530 A | 3/2017 |
| CN | 107024215 A | 8/2017 |
| CN | 108292356 A | 7/2018 |
| CN | 105679021 B | 11/2018 |
| DE | 102009050503 A1 | 11/2010 |
| JP | 2014157522 A | 8/2014 |
| JP | 2016523751 A | 8/2016 |
| JP | 2018536955 A | 12/2018 |

OTHER PUBLICATIONS

PCT International Search Report and Written Opinion for PCT/US2018/047032, dated Nov. 28, 2018, 15 pages.

SYSTEMS AND METHODS FOR PRIORITIZING OBJECT PREDICTION FOR AUTONOMOUS VEHICLES

PRIORITY CLAIM

The present application is a continuation of and claims priority to U.S. patent application Ser. No. 16/211,376 having a filing date of Dec. 6, 2018 and U.S. patent application Ser. No. 15/811,865 having a filing date of Nov. 14, 2017, both of which are based on and claim priority to U.S. Provisional Application 62/549,407 having a filing date of Aug. 23, 2017. U.S. patent application Ser. No. 16/211, 376, U.S. patent application Ser. No. 15/811,865, and U.S. Provisional Application 62/549,407 are hereby incorporated by reference herein in their entirety.

FIELD

The present disclosure relates generally to autonomous vehicles. More particularly, the present disclosure relates to systems and methods for determining a priority classification for objects that are perceived by autonomous vehicles and predicting a future location for the objects based at least in part on the respective priority classification for each object.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include obtaining, by a computing system comprising one or more processors, state data descriptive of at least a current or past state of a plurality of objects that are perceived by an autonomous vehicle. The method can further include determining, by the computing system, a priority classification for each object in the plurality of objects based at least in part on the respective state data for each object. The method can further include determining, by the computing system, an order at which the computing system determines a predicted future state for each object based at least in part on the priority classification for each object. The method can further include determining, by the computing system, the predicted future state for each object based at least in part on the determined order.

Another example aspect of the present disclosure is directed to a computing system. The computing system can include a perception system comprising one or more processors. The perception system can be configured to generate, for each of a plurality of consecutive time frames, state data descriptive of at least a current state of each of a plurality of objects that are perceived by an autonomous vehicle. The computing system can further include a priority classification system comprising one or more processors. The priority classification system can be configured to, for each of the plurality of consecutive time frames, classify each object in the plurality of objects as either high-priority or low-priority based at least in part on the respective state data for each object. The computing system can further include a prediction system comprising one or more processors. The prediction system can be configured to, for each of the plurality of consecutive time frames receive the priority classification for each respective object, determine, for the current time frame, a predicted future state for each object classified as high-priority, and provide the predicted future state for each object classified as high-priority for the current time frame to a motion planning system implemented by the one or more processors.

Another example aspect of the present disclosure is directed to an autonomous vehicle. The autonomous vehicle can include one or more processors and one or more non-transitory computer-readable media that collectively store instructions that, when executed by the one or more processors, cause the one or more processors to perform operations. The operations can include obtaining state data descriptive of at least a current or past state of a plurality of objects that are perceived by the autonomous vehicle. The operations can further include determining a priority classification for each object in the plurality of objects based at least in part on the respective state data for each object. The operations can further include determining an order at which the computing system determines a predicted future state for each object based at least in part on the priority classification for each object. The operations can further include determining the predicted future state for each object based at least in part on the determined order.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
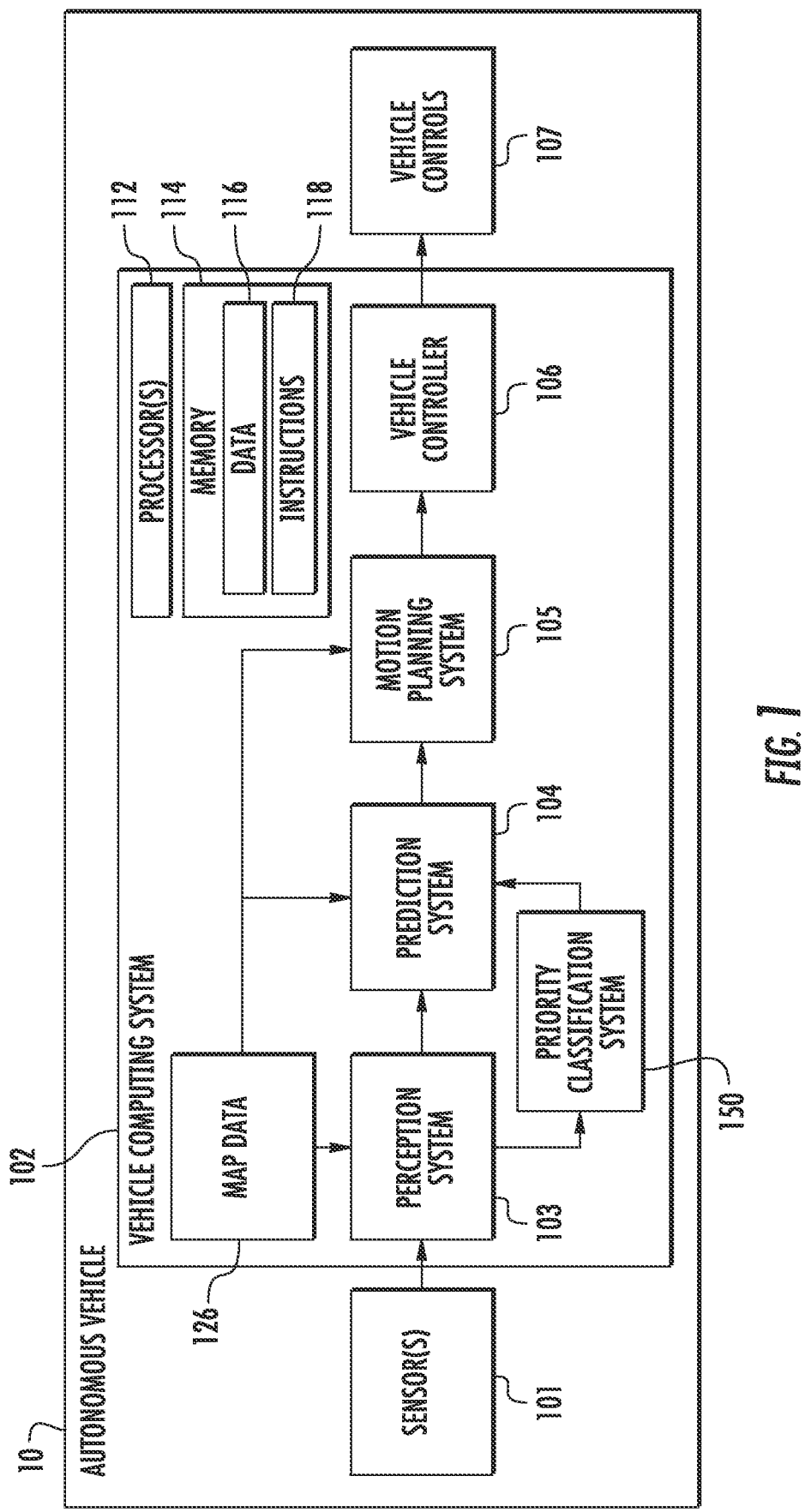
FIG. 1 depicts a block diagram of an example autonomous vehicle according to example aspects of the present disclosure.

Generally, the present disclosure is directed to systems and methods for determining a priority classification for objects that are perceived by autonomous vehicles and predicting a future location for the objects based at least in part on the respective priority classification for each object. In particular, an autonomous vehicle can include or otherwise use a prediction system to predict the future locations of the objects such as, for example, other vehicles, pedestrians, bicyclists, etc. based at least in part on perception information that describes current and/or past states of the objects and/or the surrounding environment. In some implementations, the autonomous vehicle can include or otherwise use a priority classification system to classify a respective priority of each object perceived by the perception system. For example, in some implementations, each object can be classified as either high-priority or low-priority. The prediction system can determine a predicted future state for each object based at least in part on the priority classification for each object. For example, in some implementations, the order at which the computing system determines the predicted future state for each object can be determined based on the priority classification for each object, such as, for example, by determining the predicted future state for objects classified as high-priority before predicted future states are determined for objects classified as low-priority.

As one example, in a system that operates iteratively over a number of time frames, the prediction system can determine in a current time frame the predicted future state for each object classified as high-priority in the current time frame. However, the prediction system can wait and determine (e.g., in a subsequent time frame or at least subsequent to providing the predicted future states for each object classified as high-priority to a motion planning system) the predicted future state for each object classified as low-priority in the current time frame. In such fashion, predicted future states for high-priority objects can be delivered to the motion planning system in an advanced fashion (e.g., "ahead of the schedule"), thereby allowing the motion planning system additional time to determine a motion plan relative to the high-priority objects and the vehicle additional time to implement the determined motion plan. In such fashion, the autonomous vehicle can be controlled to react more quickly relative to objects classified as high-priority. For example, the additional time gained through advancing the predicted future states by the prediction system can enable to vehicle to come to a stop more quickly or otherwise make improved maneuvers which enhance passenger and vehicle safety.

According to another aspect of the present disclosure, in some implementations, the type of prediction system used for determining the predicted future state for each object can be determined based on the priority classification for each object. For example, in some implementations a high-fidelity prediction system can be used for objects classified as high-priority, whereas a low-fidelity prediction system can be used for objects classified as low-priority.

According to another aspect of the present disclosure, the priority classification system described herein can include or leverage one or more machine-learned models that assist in classifying each object perceived by the autonomous vehicle. As an example, in some implementations, the priority classification system can include a machine-learned object classifier configured to classify each perceived object, such as by classifying each object as high-priority or low-priority. The use of machine-learned models can improve the speed, quality, and/or accuracy of object priority classification. The improved ability to classify objects according to priority can allow for more efficient use of prediction system resources by, for example, allowing for future states of higher priority objects to be predicted before lower priority objects. Further, this can allow for the predicted future states for higher priority objects to be provided to a motion planning system sooner, reducing overall latency for determining a motion plan, thereby reducing autonomous vehicle response times and enhancing passenger safety and vehicle efficiency.

More particularly, in some implementations, an autonomous vehicle can include a computing system that assists in controlling the autonomous vehicle. The autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). In some implementations, the computing system can include a perception system, a prediction system, and a motion planning system that cooperate to perceive the surrounding environment of the autonomous vehicle and determine a motion plan for controlling the motion of the autonomous vehicle accordingly. For example, the perception system can perceive one or more objects that are proximate to an autonomous vehicle, and provide state data indicative of the one or more objects to the prediction system. The prediction system can then determine a predicted future state for each object perceived by the perception system. The motion planning system can then determine a motion plan for the autonomous vehicle based on the predicted future states for the objects. In this way, an autonomous vehicle can perceive objects proximate to the autonomous vehicle, and, in response, control the autonomous vehicle accordingly.

In some implementations, an autonomous vehicle can perform each of the perception, prediction, and motion planning steps sequentially using data obtained in a plurality of consecutive time frames. For example, for a time frame N, the perception system can receive sensor data for the time frame N; the perception system can concurrently generate and provide state data to the prediction system for one or more objects perceived by the perception system for a time frame N−1; the prediction system can concurrently determine a predicted future state for each object perceived by the perception system for a time frame N−2; and a motion planning system can concurrently determine a motion plan for the autonomous vehicle using predicted future states for a time frame N−3. Thus, a motion plan for the autonomous vehicle can be iteratively determined using data from each of a plurality of consecutive time frames.

However, in such an implementation, each of the perception, prediction, and motion planning systems may require the preceding system to complete a respective analysis of data for a time frame before each system can subsequently analyze the data for the time frame. For example, for each consecutive time frame, the perception system may need to complete an analysis of data obtained from one or more sensors on the autonomous vehicle in order to generate the state data used by the prediction system. Similarly, the prediction system may need to complete an analysis of state data for a time frame to determine a predicted future state for each object before the motion planning system can determine a motion plan for the autonomous vehicle. Thus, the overall time from when an object is sensed by a sensor until a motion plan is determined in response to the object may be dependent upon each system completing its respective analysis of the object along with all other objects perceived at the same time as the object.

In contrast, the systems and methods according to example aspects of the present disclosure can allow for determining a priority classification for objects perceived by an autonomous vehicle and determining a predicted future state for each object based at least in part on the priority classification for each object, thereby enabling higher priority objects to be analyzed before lower priority objects.

In particular, in some implementations, the perception system can receive sensor data from one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle. In some implementations, the sensor data can be obtained at a plurality of consecutive time frames. Based on sensor data received from the one or more sensors and/or the map data, the perception system can identify one or more objects that are proximate to the autonomous vehicle at each time frame. As an example, in some implementations, the perception system can segment the sensor data (e.g., the LIDAR data) into discrete object polygons and/or track objects frame-to-frame (e.g., iteratively over a number of consecutive time frames or periods).

In particular, in some implementations, the perception system can generate, for each object, state data that describes a current state of such object (also referred to as one or more features of the object). As examples, the state data for each object can describe an estimate of the object's: location (also referred to as position); speed (also referred to as velocity); acceleration; heading; yaw rate; orientation; size/footprint (e.g., as represented by a bounding polygon or other shape); type/class (e.g., vehicle, pedestrian, bicycle); distance from the autonomous vehicle; minimum path to interaction with the autonomous vehicle; a minimum time duration to interaction with the autonomous vehicle; and/or other state information and/or covariances of the above-described forms of state information. In some implementations, certain state data for an object can be used to determine one or more other features for the object. For example, in some implementations, an object's position, speed, acceleration, and/or heading can be used to determine a minimum path to interaction with the autonomous vehicle or a minimum time duration to interaction with the autonomous vehicle. The perception system can provide the state data to the priority classification system and/or the prediction system (e.g., iteratively for each time frame).

According to an aspect of the present disclosure, the autonomous vehicle can further include a priority classification system configured to classify each object perceived by the autonomous vehicle. In some implementations, the priority classification system can be included in or otherwise incorporated into the perception system. In some implementations, the priority classification system can be included in or otherwise incorporated into the prediction system. The priority classification system can classify objects perceived by the perception system based on the state data for each object. For example, the priority classification system can classify each object into one of a plurality of priority categories and/or rank each object relative to each other object. The relative priority classification and/or rank for each object can be determined based on the state data for each object. The priority classification for each object can be indicative of an importance of the object to a determination for a motion plan for the autonomous vehicle. As examples, the priority classification assigned to each object can be based on a plurality of factors, such as how likely an object is to interact with the autonomous vehicle, how soon an object is likely to interact with the autonomous vehicle, whether an object is likely to impact a motion plan for the autonomous vehicle, etc. For example, a vehicle traveling at a high rate of speed towards the autonomous vehicle can be classified as a higher priority object than a vehicle traveling away from the autonomous vehicle.

In some implementations, the priority classification can be based on one or more heuristic processes. For example, one or more thresholds can be used to classify objects based on one or more features of the object. For example, a minimum time duration, a minimum path, or a minimum distance to interaction with the autonomous vehicle can be used to classify the objects based on how far away the objects are from the autonomous vehicle or how soon the objects will likely interact with the autonomous vehicle. Similarly, a heading and/or velocity can be used to classify objects. For example objects traveling on headings away from the autonomous vehicle can be classified as lower priority than objects traveling towards the autonomous vehicle, and objects traveling at higher speeds towards the autonomous vehicle can be classified as higher priority than objects traveling at lower speeds towards the autonomous vehicle. Other features can be used as well, such as object type (e.g., vehicle, bicycle, pedestrian, etc.), object size, position, or any other feature described herein.

In some implementations, each object can be classified as either high-priority or low-priority. For example, the priority classification system can classify each object as either high-priority or low-priority based on the respective state data for each object. In some implementations, a predicted future state for each high-priority object can be determined before a predicted future state is determined for any low-priority object.

In some implementations, the ratio of high-priority objects and low-priority objects can be determined based at least in part on a velocity of the autonomous vehicle. For example, in some implementations, in order to reduce the overall latency for determining a motion plan at higher speeds, fewer objects may be classified as high-priority than at lower speeds. For example, one or more thresholds or ranges can be used to determine a ratio of high-priority objects to low-priority objects based on a velocity of the autonomous vehicle. Each object can then be classified as either high-priority or low-priority based on the ratio of high-priority objects to low-priority objects.

According to another aspect of the present disclosure, the priority classification systems and methods described herein can include or leverage one or more machine-learned models that assist in classifying the objects. As an example, in some implementations, the priority classification system can include a machine-learned object priority classifier to classify each object perceived by the autonomous vehicle. In some implementations, the machine-learned object priority classifier can classify each object as either high-priority or low-priority.

According to yet another aspect of the present disclosure, the machine-learned models included in or employed by the priority classification systems described herein can be trained using log data collected during actual operation of autonomous vehicles on travelways (e.g., roadways). For example, the log data can include sensor data and/or state data for various objects perceived by an autonomous vehicle (e.g., the perception system of an autonomous vehicle) and also the resulting future state for each object that occurred subsequent and/or contemporaneous to collection of the sensor data and/or generation of the state data. Thus, the log data can include a large number of real-world examples of objects paired with the data collected and/or generated by the autonomous vehicle (e.g., sensor data, map data, perception data, etc.) contemporaneous to such perception, such as whether the object became more or less likely to interact with the autonomous vehicle in the resulting future state of the object. Training the machine-learned models on such real-world log data can enable the machine-learned models to determine object classifications which better mirror or mimic real-world object behavior.

According to additional aspects of the present disclosure, the prediction system can determine a predicted future state for each object based at least in part on the priority classification for each object. For example, the order at which the prediction system determines the predicted future state for each object can be based at least in part on the priority classification assigned to the objects. For example, in some implementations, predicted future states for higher priority objects can be determined before predicted future states for lower priority objects are determined. In some implementations, the predicted future state for each object classified as high-priority can be determined before the predicted future state is determined for any objects classified as low-priority. In some implementations, the predicted future state for each object can be determined based upon an object's relative priority as compared to each other object. For example, each object perceived by the autonomous vehicle can be assigned a relative priority rank (e.g., for Y objects, a rank of 1 to Y), and a predicted future state can be determined based on the priority rank of the objects.

The prediction system can predict the future locations of the objects based at least in part on perception information (e.g., the state data for each object) received from the perception system, map data, sensor data, and/or any other data that describes the past and/or current state of the objects, the autonomous vehicle, the surrounding environment, and/or relationship(s) therebetween. For example, the prediction system can estimate the future motion of actors or other objects over a planning horizon which corresponds to the period of time for which a motion plan for the autonomous vehicle is generated. In some implementations, the prediction system can attach probability likelihoods to each predicted motion or other future location of the objects.

In some implementations, the prediction system can receive the priority classification for each respective object perceived by the autonomous vehicle and the respective state data for each object for a plurality of consecutive time frames. For example, the perception system can provide state data for a plurality of objects at a plurality of consecutive time frames, and the priority classification system can provide a respective priority classification for each object for each of the plurality of consecutive time frames.

In some implementations, upon receiving the priority classifications and respective state data for the plurality of objects for a current (i.e., most recently obtained) time frame, the prediction system can determine a predicted future state for each object classified as high-priority for the current time frame. As used herein, the terms "current" or "most recently obtained" when used in reference to a time frame refers to the time frame most recently provided to a particular system (e.g., perception system, prediction system). For example, using state data for the current time frame, a predicted future location can be determined for each high-priority object. Once a predicted future state has been determined for each object classified as high-priority for the current timeframe, the predicted future states for each object classified as high-priority can then be provided to the motion planning system. Thus, as soon as a predicted future state has been determined for each high-priority object, a motion plan can be determined for the autonomous vehicle.

Further, in some implementations, after the prediction system has provided the predicted future state for each object classified as high-priority to the motion planning system, the prediction system can determine a predicted future state for the current timeframe for each object classified as low-priority. Thus, each object perceived by an autonomous vehicle can have a predicted future state determined by the prediction system for each time frame.

Additionally, in some implementations, the prediction system can provide a predicted future state for a previous sequential timeframe for each object classified as low-priority to the motion planning system concurrently with the predicted future states for each object classified as high-priority for the current timeframe. For example, as soon as a predicted future state for the current time frame has been determined for each high-priority object, the predicted future states for the current time frame for each high-priority object can be provided to the motion planning system along with the predicted future state for the previous sequential time frame for each low-priority object. For example, a predicted future state for each object classified as low-priority can be determined by the prediction system by selecting, obtaining, or otherwise using a predicted future state for each low-priority object from a previous sequential time frame. Thus, rather than waiting until a predicted future state has been determined for each object perceived by an autonomous vehicle in a current time frame, a full set of predicted future states comprising current predicted future states for high-priority objects and previous sequential predicted future states for low-priority objects can be provided to the motion planning system as soon as the prediction system determines a predicted future state for all high-priority objects. This can reduce the overall latency for determining a motion plan for a vehicle, thereby reducing the response time for an autonomous vehicle and increasing passenger safety.

In some implementations, the prediction system can include a low-fidelity prediction system and a high-fidelity prediction system. As used herein, the terms "low-fidelity" and "high-fidelity" refer to a relative computational intensity of the prediction system or algorithms used by the respective prediction system. For example, in some implementations, a high-fidelity prediction system can include or otherwise leverage one or more machine-learned models in order to predict a future location for each object. For example, in some implementations, the prediction system can be a goal-oriented prediction system that generates one or more potential goals, selects one or more of the most likely potential goals, and develops one or more trajectories by which the object can achieve the one or more selected goals. For example, the prediction system can include a scenario generation system that generates and/or scores the one or more goals for an object and a scenario development system that determines the one or more trajectories by which the object can achieve the goals. In some implementations, the prediction system can include a machine-learned goal-scoring model, a machine-learned trajectory development model, and/or other machine-learned models. In some implementations, a high-fidelity prediction system can be used to determine a predicted future state for objects classified as high-priority.

In some implementations, a low-fidelity prediction system can include one or more state forward integration models. For example, a low-fidelity prediction system can predict a future state for an object by forward integrating a current state. For example, a low-fidelity prediction system can use a current position, a current velocity, and a current heading of an object to determine a predicted future location for the object at a future time period. In some implementations, a low-fidelity prediction system can be used to determine a predicted future state for objects classified as low-priority.

In this way, the systems and methods according to example aspects of the present disclosure can allow for determining a priority classification for objects perceived by an autonomous vehicle. In particular, by applying one or more heuristic processes and/or using machine-learned models, the systems and methods of the present disclosure can determine a respective priority classification for each object perceived by an autonomous vehicle. The order at which a predicted future state is determined for each object can then be determined based at least upon the respective priority classification for each object. The ability to classify objects according to a respective priority can allow for computational resources to be focused on higher-priority objects.

As such, one technical effect and benefit of the present disclosure is reduced latency for determining a predicted future location for higher priority objects which are more likely to impact a motion plan for an autonomous vehicle than low-priority objects. In particular, the present disclosure provides techniques that enable a computing system to determine a motion plan for an autonomous vehicle as soon as a predicted future location for all high-priority objects has been determined. Thus, the present disclosure can allow for a reduction in the time required for an autonomous vehicle to perceive an object and determine a motion plan in response to the object. Further, the present disclosure can allow for higher fidelity prediction systems to be used to determine predicted future locations for higher priority objects, and lower fidelity prediction systems to be used to determine predicted future locations for lower priority objects. This can allow for more efficient use of computing resources on board an autonomous vehicle.

The present disclosure also provides additional technical effects and benefits, including, for example, enhancing passenger safety. For example, the systems and methods according to example aspects of the present disclosure can allow for reduced reaction times for determining a motion plan in response to an object perceived by the autonomous vehicle. This can allow an autonomous vehicle to come to a stop more quickly, navigate around the object, or otherwise respond to the object more quickly, thereby reducing the likelihood of an autonomous vehicle colliding with the object.

With reference now to the FIGS., example aspects of the present disclosure will be discussed in further detail. FIG. 1 depicts a block diagram of an example autonomous vehicle 10 according to example aspects of the present disclosure. The autonomous vehicle 10 can include one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 can include one or more processors 112 and a memory 114. The one or more processors 112 can be any suitable processing device (e.g., a processor core, a microprocessor, an ASIC, a FPGA, a computing device, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which can be executed by the processor 112 to cause vehicle computing system 102 to perform operations.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10. In some implementations, the sensors 101 can be located at various different locations on the autonomous vehicle 10. As an example, in some implementations, one or more cameras and/or LIDAR sensors can be located in a pod or other structure that is mounted on a roof of the autonomous vehicle 10 while one or more RADAR sensors can be located in or behind the front and/or rear bumper(s) or body panel(s) of the autonomous vehicle 10. As another example, camera(s) can be located at the front or rear bumper(s) of the vehicle 10 as well. Other locations can be used as well.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object (also referred to as features of the object). As examples, the state data for each object can describe an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the autonomous vehicle; minimum path to interaction with the autonomous vehicle; minimum time duration to interaction with the autonomous vehicle; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at such locations. In some implementations, the motion planning system 105 can determine the motion plan for the autonomous vehicle using one or more adjusted vehicle parameters, as described herein.

In some implementations, the motion planning system 105 can evaluate one or more cost functions and/or one or more reward functions for each of one or more candidate motion plans for the autonomous vehicle 10. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations of objects, the motion planning system 105 can determine a total cost (e.g., a sum of the cost(s) and/or reward(s) provided by the cost function(s) and/or reward function(s)) of adhering to a particular candidate pathway. The motion planning system 105 can select or determine a motion plan for the autonomous vehicle 10 based at least in part on the cost function(s) and the reward function(s). For example, the motion plan that minimizes the total cost can be selected or otherwise determined. The motion planning system 105 can provide the selected motion plan to a vehicle controller 106 that controls one or more vehicle controls 107 (e.g., actuators or other devices that control gas flow, steering, braking, etc.) to execute the selected motion plan.

According to example aspects of the present disclosure, the vehicle computing system 102 can also include a priority classification system 150 configured to classify one or more objects perceived by the autonomous vehicle 10. For example, in some implementations, the priority classification system 150 can receive state data descriptive of one or more objects perceived by the autonomous vehicle 10 from the perception system 103. The priority classification system 150 can then classify each object based at least in part on the respective state data for each object.

For example, in some implementations, the priority classification for each object can be based on an object's position, velocity, and/or heading. For example, objects that are closer to the autonomous vehicle can be given a higher priority classification. Similarly, objects that are traveling in a direction towards the autonomous vehicle and/or towards a position at which the autonomous vehicle will be at a forthcoming time period can be given a higher priority classification. In some implementations, objects that are traveling at higher speeds, such as objects traveling at higher speeds towards the autonomous vehicle, can be given a higher priority classification than objects traveling at lower speeds.

In some implementations, the priority classification can be based on a likelihood that an object will interact with the autonomous vehicle or otherwise be of importance to determining a motion plan for the autonomous vehicle. For example, objects traveling in an opposite direction as the autonomous vehicle can be given a lower priority classification than objects traveling in a direction that will interact with a motion path of the autonomous vehicle.

In some implementations, the priority classification can be based on an object type. For example, in some implementations, pedestrians can be assigned a higher priority than other objects, such as a static (i.e., non-moving) vehicle. Similarly, other object types and/or classes can be used to determine a priority classification for each object.

In some implementations, the priority classification for each object can be based on a minimum path to interaction with the autonomous vehicle or a minimum time duration to interaction with the autonomous vehicle. For example, a minimum path to interaction with the autonomous vehicle can correspond to a distance along one or more travelways that the object would have to traverse in order to interact with the object. Thus, for example, a vehicle traveling along a highway in an opposite direction as the autonomous vehicle may need to exit the highway, turn around, re-enter the highway, and overtake the autonomous vehicle in order to interact with the autonomous vehicle. In such a case, the vehicle is likely to have a long minimum path to interaction and/or minimum time duration to interaction with the autonomous vehicle. Conversely, a vehicle approaching an intersection at a perpendicular path of travel to the autonomous vehicle is likely to have a shorter minimum path to interaction and/or minimum time duration to interaction with the autonomous vehicle. In such a case, the vehicle approaching the intersection can be given a higher priority classification than the vehicle traveling in the opposite direction.

In some implementations, the priority classification system 150 can classify each object as high-priority or low-priority. For example, each object can be classified according to a binary classification in which each object is either a high-priority or low-priority object. For example, objects which have a minimum path to interaction and/or minimum time duration to interaction with an autonomous vehicle that is less than a threshold can be classified as high-priority objects. Similarly, objects which have a minimum path to interaction and/or minimum time duration to interaction that exceeds the threshold can be classified as low-priority objects. In some implementations, objects of a particular type (e.g., pedestrians) can always be classified as high-priority objects. In some implementations, objects which have been determined to be unlikely to interact with the autonomous vehicle or the determination of a motion plan for the autonomous vehicle can be classified as low-priority objects.

In some implementations, the priority classification system 150 can classify each object relative to other objects perceived by the autonomous vehicle. For example, in some implementations, each object can be assigned a relative priority in relation to each other object perceived by the autonomous vehicle. For example, each object can be assigned a relative priority rank based on the respective priority of the object. For example, if an autonomous vehicle perceives Y objects within a surrounding environment of the autonomous vehicle, each object can be assigned a relative rank on a scale of 1 to Y. In this way, each object can be assigned a priority classification relative to each other object perceived by the autonomous vehicle.

In some implementations, the priority classification system 150 can classify each object based on a velocity of the autonomous vehicle. In some implementations, a ratio of high-priority objects to low-priority objects can be determined based on a velocity of the vehicle. For example, at higher velocities, it may be preferable to limit the number of high-priority objects in order to reduce and/or minimize the number of high-priority objects for which the prediction system 104 must determine a future predicted state in a current time frame in order to reduce and/or minimize a latency for determining a motion plan in response to such objects. In such a case, fewer objects may be classified as high-priority objects than at lower velocities.

In some implementations, the ratio of high-priority objects to low-priority objects can be determined based on one or more threshold velocities. For example, for a first velocity range of 1 to X, a ratio of 1 high-priority object to Y low-priority objects can be used, whereas for a second velocity range of X to 2X, a ratio of 1 high priority object to 2Y low-priority objects can be used. In other implementations, other pre-determined ratios can be used. In some implementations, each object can be classified as either high-priority or low-priority such that the ratio of high-priority objects to low-priority objects generally conforms to the pre-determined ratio (i.e., the ratio of high-priority to low-priority objects is within a threshold variance of the pre-determined ratio).

In some implementations, a machine-learned model can be used to determine the priority classification for each object based on the respective state data for each object. For example, in some implementations, the machine-learned model can be configured to classify each object as either high-priority or low-priority and provide the priority classification for each object to the prediction system 104. In some implementations, the respective state data for each object can be input into the machine-learned model, and data indicative of a respective priority classification for the object can be received as an output of the machine-learned model.

In some implementations, the machine-learned model can be trained based at least in part on training data that comprises annotated vehicle data logs that were previously collected during previous autonomous vehicle driving sessions. For example, vehicle data logs can be recorded during one or more autonomous vehicle driving sessions, which can include state data for objects perceived by the autonomous vehicle. In some implementations, the vehicle data logs can be annotated by a human reviewer in order to help train the machine-learned model. For example, in some implementations, objects can be labeled either high-priority or low-priority. The machine-learned model can then be trained to determine a priority classification for objects based on the training data.

According to example aspects of the present disclosure, the vehicle computing system 102 can determine a predicted future state for each object based at least in part on the priority classification for each object. For example, the priority classification system 150 can be configured to provide the priority classification for each object perceived by the perception system 103 to the prediction system 104. The prediction system 104 can then determine a predicted future state for each object based at least in part on the priority classification for each object.

For example, in some implementations, the order at which the computing system determines the predicted future state for each object can be based at least in part on the priority classification assigned to each object. For example, in some implementations, predicted future states for all objects classified as high-priority can be determined before predicted future states are determined for any low-priority objects. In some implementations, a predicted future state can be determined for each object according to a respective priority rank for each object. For example, for Y objects, each object can be assigned a relative priority rank of 1 to Y, and a predicted future state for each object can be determined based on the relative priority rank for each object (i.e., starting with 1 and ending with Y).

As will be discussed in greater detail with respect to FIG. 5, in some implementations, a future location prediction system can be selected based at least in part on the priority classification for each object. For example, in some implementations, a low-fidelity prediction system can be used to determine a predicted future state for low-priority objects, and a high-fidelity prediction system can be used to determine a predicted future state for high-priority objects.

Each of the perception system 103, the prediction system 104, the motion planning system 105, the vehicle controller 106, and the priority classification system 150 can include computer logic utilized to provide desired functionality. In some implementations, each of the perception system 103, the prediction system 104, the motion planning system 105, the vehicle controller 106, and the priority classification system 150 can be implemented in hardware, firmware, and/or software controlling a general purpose processor. For example, in some implementations, each of the perception system 103, the prediction system 104, the motion planning system 105, the vehicle controller 106, and the priority classification system 150 includes program files stored on a storage device, loaded into a memory and executed by one or more processors. In other implementations, each of the perception system 103, the prediction system 104, the motion planning system 105, the vehicle controller 106, and the priority classification system 150 includes one or more sets of computer-executable instructions that are stored in a tangible computer-readable storage medium such as RAM hard disk or optical or magnetic media.

Figure 2:
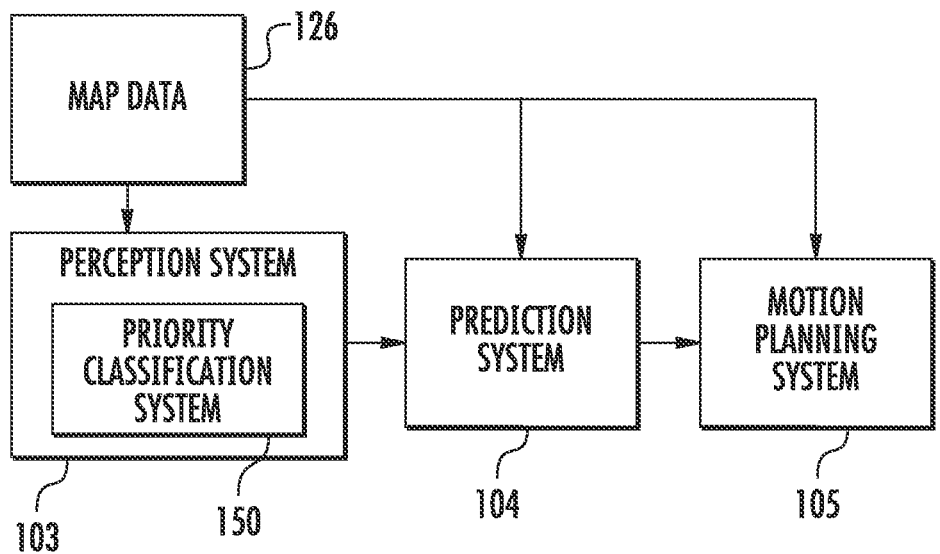
FIG. 2 depicts an example perception system according to example aspects of the present disclosure.

Referring now to FIG. 2, a block diagram depicting an example perception system 103 according to example aspects of the present disclosure is shown. Elements that are the same or similar to those shown in FIG. 1 are referred to with the same reference numerals.

As shown, in some implementations, the priority classification system 150 can be implemented as a subpart of the perception system 103. For example, the perception system 103 can receive sensor data from one or more sensors 101 (as shown in FIG. 1) and map data 126. The perception system 103 can generate state data for each object perceived by the autonomous vehicle 10, perform a priority classification for each object using the priority classification system 150, and provide the state data and respective priority classification for each object to the prediction system 104.

Figure 3:
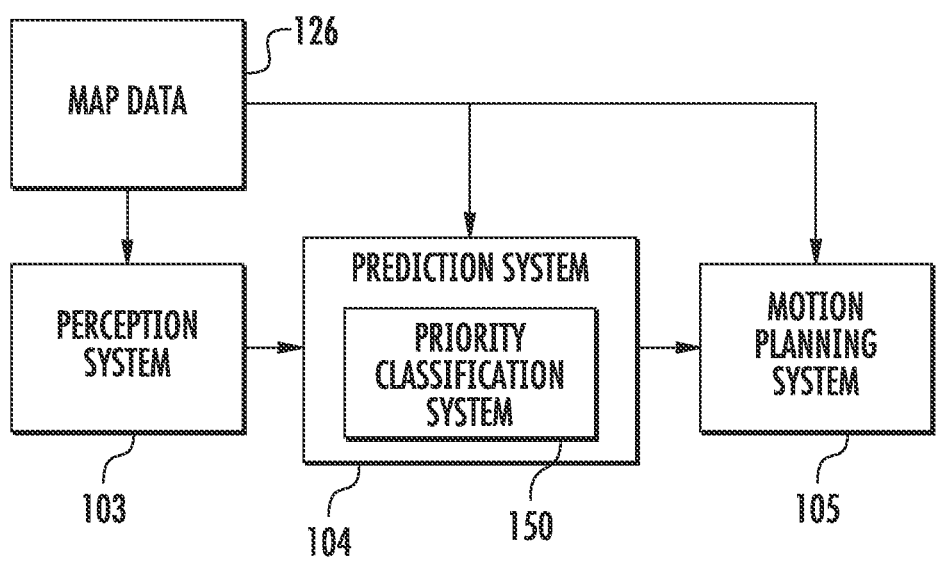
FIG. 3 depicts an example prediction system according to example aspects of the present disclosure.

Referring now to FIG. 3, a block diagram depicting an example prediction system 104 according to example aspects of the present disclosure is shown. Elements that are the same or similar to those shown in FIGS. 1 and 2 are referred to with the same reference numerals.

As shown, in some implementations, the priority classification system 150 can be implemented as a subpart of the prediction system 104. For example, the perception system 103 can receive sensor data from one or more sensors 101 (as shown in FIG. 1) and map data 126. The perception system 103 can then provide the state data indicative of one or more objects to the prediction system 104. The prediction system 104 can then determine a priority classification for each object using the priority classification system 150, and determine a predicted future state for each object based at least in part on the priority classification for each object. The prediction system 104 and then provide the predicted future states for each object to the motion planning system 105.

Thus, as shown in FIGS. 1-3, the priority classification system 150 can be implemented as a stand-alone priority classification system 150, or as a sub system of either a perception system 103 or a prediction system 104.

Figure 4:
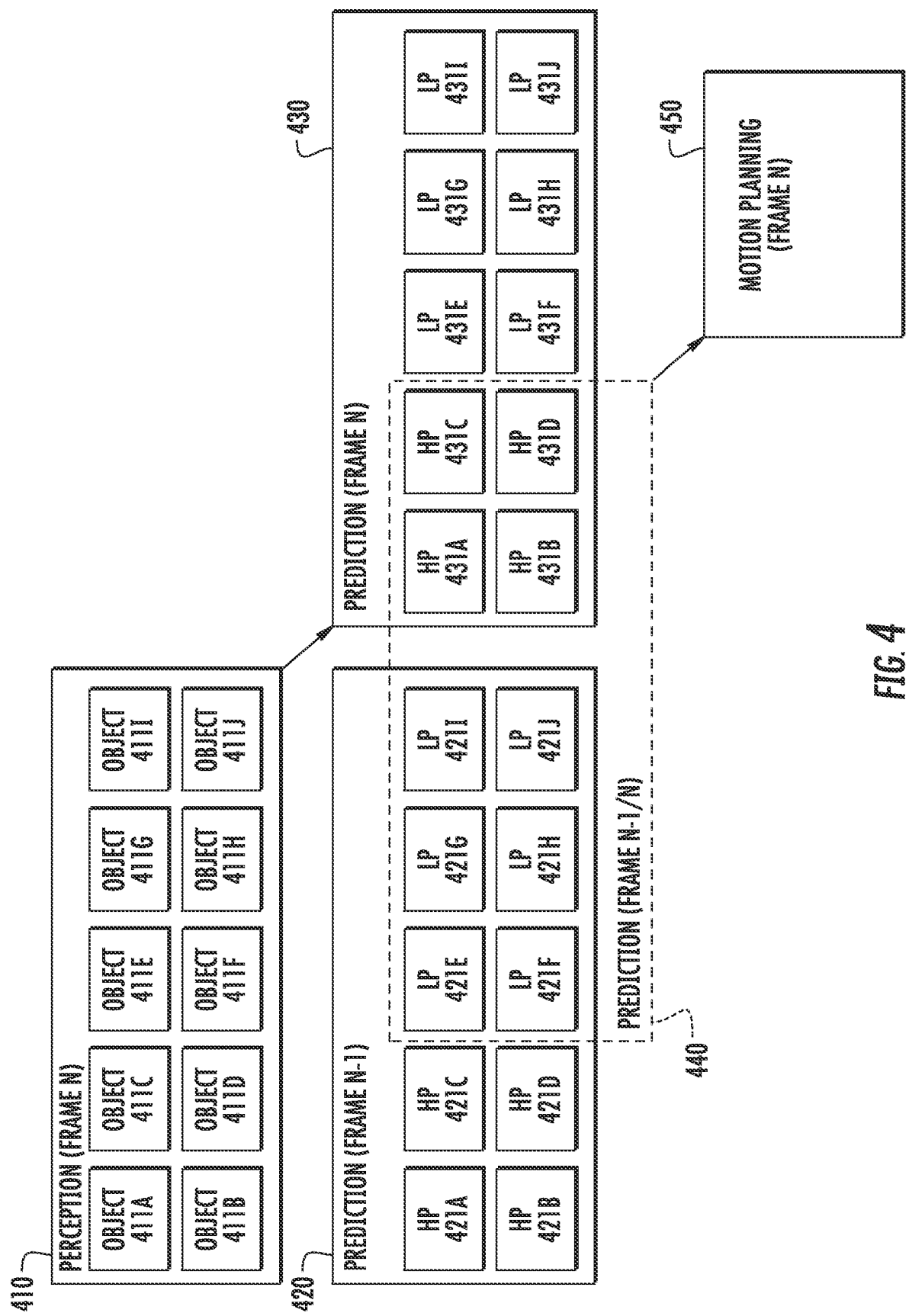
FIG. 4 depicts a block diagram of an example object prediction process according to example aspects of the present disclosure.

Referring now to FIG. 4, a diagram of an example object prediction process according to example aspects of the present disclosure is shown. As represented in FIG. 4, in some implementations, a vehicle computing system can iteratively determine a motion plan using data obtained in a plurality of consecutive time frames. For example, each of the perception, prediction, and motion planning systems illustrated in FIGS. 1-3 can concurrently perform analysis on data from a plurality of consecutive time frames. As an example, for a time frame N, the perception system can receive sensor data for the time frame N; the perception system can concurrently generate and provide state data to the prediction system for one or more objects perceived by the perception system for a time frame N−1; the prediction system can concurrently determine a predicted future state for each object perceived by the perception system for a time frame N−2; and a motion planning system can concurrently determine a motion plan for the autonomous vehicle using predicted future states for a time frame N−3. In a subsequent time frame N+1, each of the perception, prediction, and motion planning systems can receive and perform a respective analysis of data received from an upstream system, resulting in the motion planning system determining a motion plan using predicted future states for a time frame N−2. In this way, a motion plan for the autonomous vehicle can be iteratively determined using data from each of a plurality of consecutive time frames.

For example, as shown in FIG. 4, block 410 represents analysis by a perception system for data from a frame N. As shown, the perception system's analysis of data for frame N can include a plurality of objects 411A-J. Each of the objects can have associated state data descriptive of the object generated by the perception system. For example, for each object 411A-J, the perception system can generate state data describing a position, velocity, acceleration, heading, size, type, yaw rate, or other state data descriptive of the object as described herein.

As represented by the arrow from block 410 to block 430, the state data descriptive of the objects 411A-J generated by the perception system for frame N can be provided to the prediction system once the perception system has completed its analysis.

According to example aspects of the present disclosure, however, the prediction system can also receive a priority classification for each object. For example, in some implementations, each object can be classified as either high-priority ("HP") or low-priority ("LP"). As described herein, the priority classification for each object can be determined based on the respective state data for each object. Further, in some implementations, the priority classification can be determined by a machine-learned model.

Thus, as represented by block 430, the prediction system can receive the respective priority classifications for each object as well as the respective state data describing each object from the perception system. The perception system can then determine a predicted future state for each object based at least in part on the respective priority classification for each object. For example, in some implementations, the prediction system can first determine a predicted future state for each object classified as high-priority. For example, as shown in FIG. 4, the prediction system can first determine a predicted future state for HP objects 431A-D. Stated differently, the prediction system can determine a predicted future state for each object classified as high-priority based at least in part on the state data obtained for the most recent time frame (Frame N).

According to additional example aspects of the present disclosure, once the prediction system has determined a predicted future state for each object classified as high-priority, the prediction system can provide the predicted future state for each object classified as high-priority for the current timeframe to the motion planning system. For example, as shown by the arrow from the dashed block 440 to the block 450, once the prediction system has determined a predicted future state for each high-priority object HP 431A-D, the prediction system can provide the predicted future states for the objects HP 431A-D to the motion planning system. In this way, the motion planning system can begin determining a motion plan in an advanced fashion (e.g., "ahead of schedule").

According to additional example aspects of the present disclosure, once the prediction system has determined a predicted future state for each object classified as high-priority, the prediction system can determine a predicted future state for each object identified as low-priority. For example, after the prediction system has provided the high-priority objects HP 431A-D to the motion planning system, the prediction system can determine a predicted future state for each low priority object LP 431E-J. In this way, each object perceived in a particular frame (e.g., frame N) can have a predicted future state determined by the prediction system.

In some implementations, the prediction system can further be configured to provide a predicted future state for the previous sequential timeframe for each object classified as low-priority to the motion planning system concurrently with the predicted future state for each object classified as high-priority for the current timeframe. Stated differently, in some implementations, a predicted future state for a low-priority object can be determined by selecting, obtaining, or otherwise determining a predicted future state for the object based on state data obtained for a previous sequential time frame.

For example, as shown by block 420, the prediction system can have previously determined a predicted future state for objects 421A-J, including high-priority objects HP 421A-D and low-priority objects LP 421E-J. For example, as the perception system generated state data for objects 411A-J for time frame N in block 410, the prediction system could concurrently determine predicted future states for high-priority objects HP 421A-D and low-priority objects LP 421E-J for time frame N−1 in block 420. Further, as an example, each high-priority object HP 421A-D can respectively correspond to each high-priority object HP 431A-D for the time frame N−1, whereas each low-priority object LP 421E-J can respectively correspond to each low-priority object LP 431E-J for the time frame N−1.

Thus, as represented by the arrow from block 440 to block 450, when the prediction system provides the predicted future states for high-priority objects HP 431A-D to the motion planning system, the prediction system can be configured to concurrently provide a previously determined predicted future state for each low-priority object (i.e., LP 431E-J) for the previous sequential time frame (i.e., LP 421E-J). In this way, a full set of predicted future states comprising the predicted future states for all high-priority objects (HP 431A-D) for a current time frame and a previously determined predicted future state for all low-priority objects (LP 421E-J) for a previous sequential time frame can be concurrently provided to a motion planning system as soon as the prediction system has determined a predicted future state for each object classified as high-priority (HP 431A-D).

An advantage provided by the object prediction process depicted in FIG. 4 is that the time required to determine a motion plan for an autonomous vehicle can be reduced. For example, for a vehicle autonomy system such as the sequential vehicle autonomy system described herein, the motion planning system can receive a predicted future state for each object much sooner, thereby allowing a motion plan to be determined ahead of schedule. Further, the reduction in time for the prediction system to determine a predicted future state for each object can correspond to the ratio of high-priority objects to low-priority objects. For example, as depicted in FIG. 4, the prediction system would only need to determine a predicted future state for high-priority objects HP 431A-D (i.e., 4 out of 10 objects) for time frame N before providing the predicted future states for each object 431A-D and 421E-J to the motion planning system, allowing for a reduction of approximately 60% of the required processing time.

Further, because low-priority objects can be classified as such based on their negligible impact on a motion plan, using a predicted future state for a low-priority object from a previous sequential time frame can allow for a net increase in passenger and autonomous vehicle safety. For example, low-priority objects, such as objects positioned far away from an autonomous vehicle and traveling away from the autonomous vehicle, may be unlikely to impact the motion plan for the autonomous vehicle. However, high-priority objects, such as objects travelling towards the autonomous vehicle or positioned near the autonomous vehicle, may be much more likely to impact a motion plan for the autonomous vehicle. By allowing for such high-priority objects to be sensed by the sensors, perceived by the perception system, predicted by the prediction system, and planned for by the motion planning system in a reduced amount of time, the autonomous vehicle can respond to high-priority objects in a quicker fashion, thereby reducing the likelihood of unsafe conditions, such as a collision.

Figure 5:
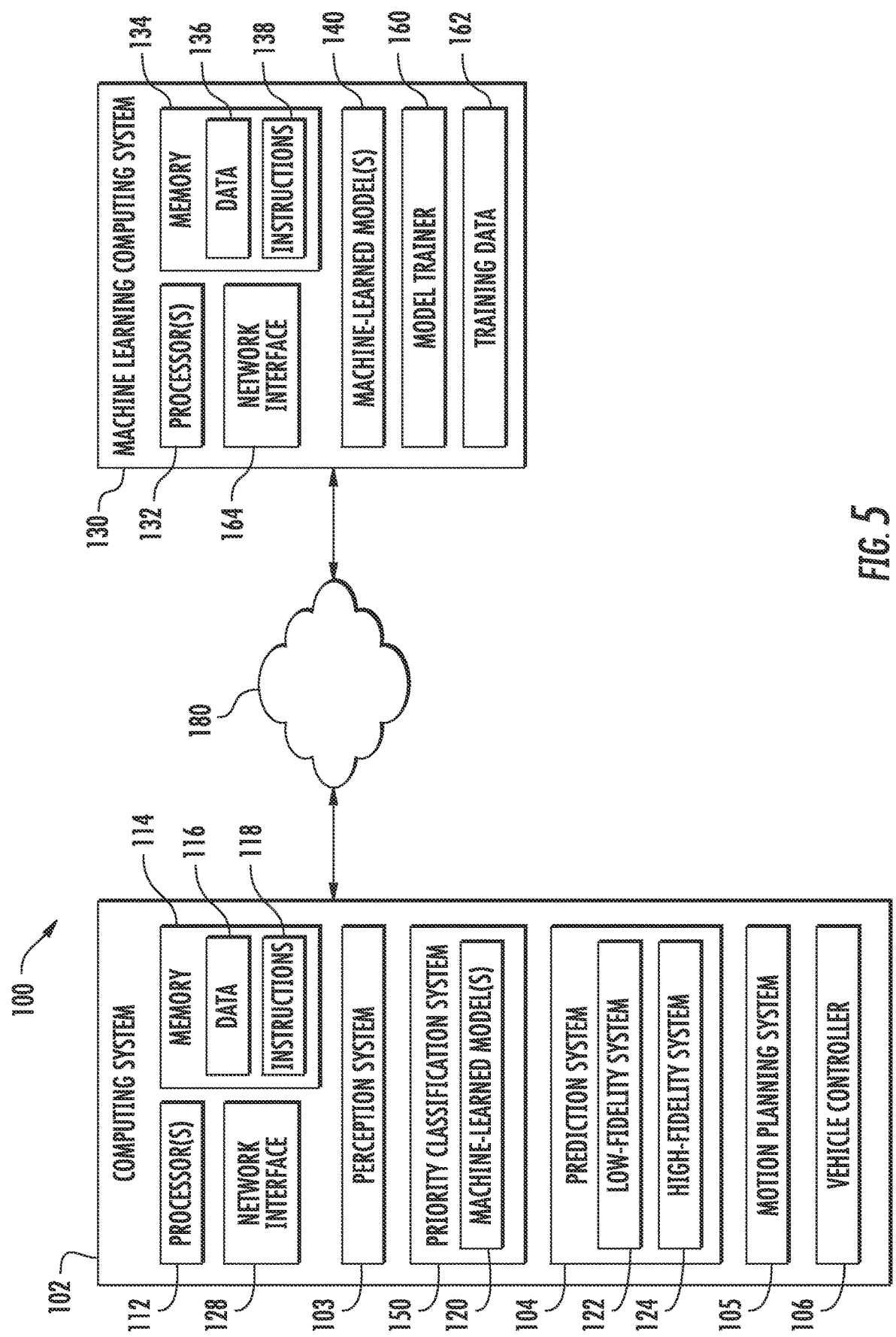
FIG. 5 depicts a block diagram of an example computing system according to example aspects of the present disclosure.

Referring now to FIG. 5, a block diagram of an example computing system 100 according to example embodiments of the present disclosure is depicted. Elements that are the same or similar to those in FIGS. 1-3 are referred to with the same reference numerals. As shown, the example computing system 100 can include a computing system 102 (e.g., a vehicle computing system 102 on an autonomous vehicle 10) and a machine learning computing system 130 that are communicatively coupled over one or more communication networks 180.

The computing system 102 can include one or more processor(s) 112 and memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. The memory 114 can also store computer-readable instructions 118 that can be executed by the one or more processors 112. The instructions can be software written in any suitable programming language or can be implemented in hardware. Additionally, or alternatively, the instructions can be executed in logically and/or virtually separate threads on processor(s) 112. For example, the memory 114 can store instructions that when executed by the one or more processors 112 cause the one or more processors 112 to perform any of the operations and/or functions described herein.

The computing system 102 can also include a network interface 128 used to communicate with one or more systems or devices, including systems or devices that are remotely located from the computing system 102. The network interface 128 can include any circuits, components, software, etc. for communicating with one or more networks (e.g., 180). In some implementations, the network interface 128 can include, for example, one or more of a communications controller, receiver, transceiver, transmitter, port, conductors, software and/or hardware for communicating data.

The computing system 102 can also include a perception system 103, a prediction system 104, a motion planning system 105, a vehicle controller 106, and a priority classification system 150, as described herein. Each of the perception system 103, the prediction system 104, the motion planning system 105, the vehicle controller 106, and the priority classification system 150 can include computer logic utilized to provide desired functionality. In some implementations, each of the perception system 103, the prediction system 104, the motion planning system 105, the vehicle controller 106, and the priority classification system 150 can be implemented in hardware, firmware, and/or software controlling a general purpose processor. For example, in some implementations, each of the perception system 103, the prediction system 104, the motion planning system 105, the vehicle controller 106, and the priority classification system 150 can include program files stored on a storage device, loaded into a memory and executed by one or more processors. In other implementations, each of the perception system 103, the prediction system 104, the motion planning system 105, the vehicle controller 106, and the priority classification system 150 can include one or more sets of computer-executable instructions that are stored in a tangible computer-readable storage medium such as RAM hard disk or optical or magnetic media.

According to an example aspect of the present disclosure, in some implementations, the prediction system 104 can include a low-fidelity prediction system 122 and a high-fidelity prediction system 124. For example, in some implementations, a high-fidelity prediction system 124 can include or otherwise leverage one or more machine-learned models in order to predict a future location for each object. For example, in some implementations, the high-fidelity prediction system 124 can be a goal-oriented prediction system that generates one or more potential goals, selects one or more of the most likely potential goals, and develops one or more trajectories by which the object can achieve the one or more selected goals. For example, the high-fidelity prediction system 124 can include a scenario generation system that generates and/or scores the one or more goals for an object and a scenario development system that determines the one or more trajectories by which the object can achieve the goals. In some implementations, the high-fidelity prediction system 124 can include a machine-learned goal-scoring model, a machine-learned trajectory development model, and/or other machine-learned models.

In some implementations, a low-fidelity prediction system 122 can include one or more state forward-integration models. For example, a low-fidelity prediction system 122 can predict a future state for an object by forward integrating a current state. For example, a low-fidelity prediction system can use a current position, a current velocity, and a current heading of an object to determine a predicted future location for the object at a future time period.

In some implementations, the computing system 102 can determine a predicted future state for each object based at least in part on the priority classification for the object by selecting a future location prediction system based at least in part on the priority classification for the object and determining the predicted future state for the object using the selected future location prediction system. For example, in some implementations, the low-fidelity prediction system 122 can be used to determine a predicted future state for objects classified as low-priority, and the high-fidelity prediction system 124 can be used to determine a predicted future state for objects classified as high-priority.

An advantage provided by using a low-fidelity prediction system and a high-fidelity prediction system to determine the predicted future state for each object based at least in part on the priority classification for each object is that computing resources can be allocated more efficiently. For example, low-priority objects which have been classified as such due to their likely negligible impact on a vehicle motion plan may not require a sophisticated prediction system, such as the high-fidelity prediction system 124, in order to determine a predicted future state for such objects. For example, low-priority objects located far away from an autonomous vehicle and/or travelling in a direction away from the autonomous vehicle may have little to no impact on the motion plan for the autonomous vehicle. As such, the granularity provided by a goal-oriented prediction system as described herein may provide little to no benefit over a low-fidelity prediction model 122, such as a simple state forward-integration model. Accordingly, by first determining a priority classification for each object, computational resources can be more efficiently allocated for determining predicted future states for each object.

According to another example aspect of the present disclosure, the priority classification system 150 can store or include one or more machine-learned models 120. For example, the machine-learned model 120 can be or can otherwise include various machine-learned models such as decision tree-based models, support vector machines, k-Nearest Neighbor models, neural networks (e.g., deep neural networks), or other multi-layer non-linear models. Example neural networks include feed-forward neural networks, recurrent neural networks (e.g., long short-term memory recurrent neural networks), or other forms of neural networks.

In some implementations, the one or more machine-learned models 120 can include a machine-learned object priority classifier. For example, in some implementations, a machine-learned object priority classifier can be configured to classify objects perceived by the perception system 103 as either high-priority or low-priority. In some implementations, the machine-learned object priority classifier can be configured to rank objects according to a respective object priority, as described herein.

In some implementations, the computing system 102 can determine a priority classification for each object using the machine-learned model 120. For example, the computing system 102 can obtain data descriptive of the machine-learned model, input the respective state data for each object perceived by the perception system 103 into the machine-learned model 120, and receive data indicative of a respective priority classification for each object as an output of the machine-learned model. In some implementations, the machine-learned model 120 and/or the priority classification system 150 can be configured to provide the respective priority classification for each object to the prediction system 104.

In some implementations, the vehicle computing system 102 can receive the one or more machine-learned models 120 from the machine learning computing system 130 over network 180 and can store the one or more machine-learned models 120 in the memory 114. The vehicle computing system 102 can then use or otherwise implement the one or more machine-learned models 120 (e.g., by processor(s) 112).

In some implementations, certain operations described herein can be performed by a machine learning computing system 130 that is remotely located to the computing system 102 and in communication with the computing system 102 over one or more wireless networks 180 (e.g., cellular data networks, satellite communication networks, wide area networks, etc.). As an example, the machine learning computing system 130 can include one or more server computing devices. In the event that plural server computing devices are used, the server computing devices can be arranged according to a parallel computing architecture, a sequential computing architecture, or combinations thereof.

The machine learning computing system 130 can include one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage media, such as RAM, ROM, EEPROM, EPROM, one or more memory devices, flash memory devices, etc., and combinations thereof.

The memory 134 can store information that can be accessed by the one or more processors 132. For instance, the memory 134 (e.g., one or more non-transitory computer-readable storage mediums, memory devices) can store data 136 that can be obtained, received, accessed, written, manipulated, created, and/or stored. In some implementations, the machine learning computing system 130 can obtain data from one or more memory device(s) that are remote from the system 130.

The memory 134 can also store computer-readable instructions 138 that can be executed by the one or more processors 132. The instructions 138 can be software written in any suitable programming language or can be implemented in hardware. Additionally, or alternatively, the instructions 138 can be executed in logically and/or virtually separate threads on processor(s) 132. For example, the memory 134 can store instructions 138 that when executed by the one or more processors 132 cause the one or more processors 132 to perform any of the operations and/or functions described herein.

The machine learning computing system 130 can also include a network interface 164 used to communicate with one or more systems or devices, including systems or devices that are remotely located from the machine learning computing system 130. The network interface 164 can include any circuits, components, software, etc. for communicating with one or more networks (e.g., 180). In some implementations, the network interface 164 can include, for example, one or more of a communications controller, receiver, transceiver, transmitter, port, conductors, software and/or hardware for communicating data.

In some implementations, the machine learning computing system 130 includes one or more server computing devices. If the machine learning computing system 130 includes multiple server computing devices, such server computing devices can operate according to various computing architectures, including, for example, sequential computing architectures, parallel computing architectures, or some combination thereof.

In addition or alternatively to the model(s) 110 at the computing system 102, the machine learning computing system 130 can include one or more machine-learned models 140. For example, the machine learned model(s) 140 can be or can otherwise include various machine-learned models such as decision tree-based models, support vector machines, k-Nearest Neighbor models, neural networks (e.g., deep neural networks), or other multi-layer non-linear models. Example neural networks include feed-forward neural networks, recurrent neural networks (e.g., long short-term memory recurrent neural networks), or other forms of neural networks.

As an example, the machine learning computing system 130 can communicate with the computing system 102 according to a client-server relationship. For example, the machine learning computing system 140 can implement the machine-learned model(s) 140 to provide a web service to the computing system 102. For example, the web service can provide object priority classifications to the computing system 102.

Thus, machine-learned models 110 can be located and used at the computing system 102 and/or machine-learned models 140 can be located and used at the machine learning computing system 130.

In some implementations, the machine learning computing system 130 and/or the computing system 102 can train the machine-learned models 110 and/or 140 through use of a model trainer 160. The model trainer 160 can train the machine-learned models 110 and/or 140 using one or more training or learning algorithms. One example training technique is backwards propagation of errors. In some implementations, the model trainer 160 can perform supervised training techniques using a set of labeled training data 162. In other implementations, the model trainer 160 can perform unsupervised training techniques using a set of unlabeled training data 162. The model trainer 160 can perform a number of generalization techniques to improve the generalization capability of the models being trained. Generalization techniques include weight decays, dropouts, or other techniques.

In particular, the model trainer 160 can train a machine-learned model 110 and/or 140 based on a set of training data 162. The training data 162 can include, for example, vehicle data logs from previously completed autonomous vehicle driving sessions. The vehicle data logs can include, for example, sensor data obtained by one or more sensors of the autonomous vehicle, state data descriptive of one or more objects perceived by the perception system 103 of the autonomous vehicle, predicted future states for objects perceived by the autonomous vehicle determined by the prediction system 104, previous motion plans determined by the motion planning system 105, or other vehicle data as described herein. In some implementations, the model trainer 160 can be configured to train the machine-learned models 110 and/or 140 by determining whether objects perceived by the autonomous vehicle impacted a motion plan of the autonomous vehicle.

According to another aspect of the present disclosure, the training data 162 can include vehicle data logs that include object priority classification labels recorded by a human reviewer can be used to train the machine-learned model(s) 110 and/or 140. In particular, a human reviewer can review the vehicle data logs and label object priority classifications for objects perceived by the perception system 103.

The model trainer 160 includes computer logic utilized to provide desired functionality, and can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network(s) 180 can be any type of network or combination of networks that allows for communication between devices. In some embodiments, the network(s) 180 can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

FIG. 5 illustrates one example computing system 100 that can be used to implement the present disclosure. Other computing systems can be used as well. For example, in some implementations, the computing system 102 can include the model trainer 160 and the training dataset 162. In such implementations, the machine-learned models 110 can be both trained and used locally at the computing system 102. As another example, in some implementations, the computing system 102 is not connected to other computing systems.

In addition, components illustrated and/or discussed as being included in one of the computing systems 102 or 130 can instead be included in another of the computing systems 102 or 130. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Figure 6:
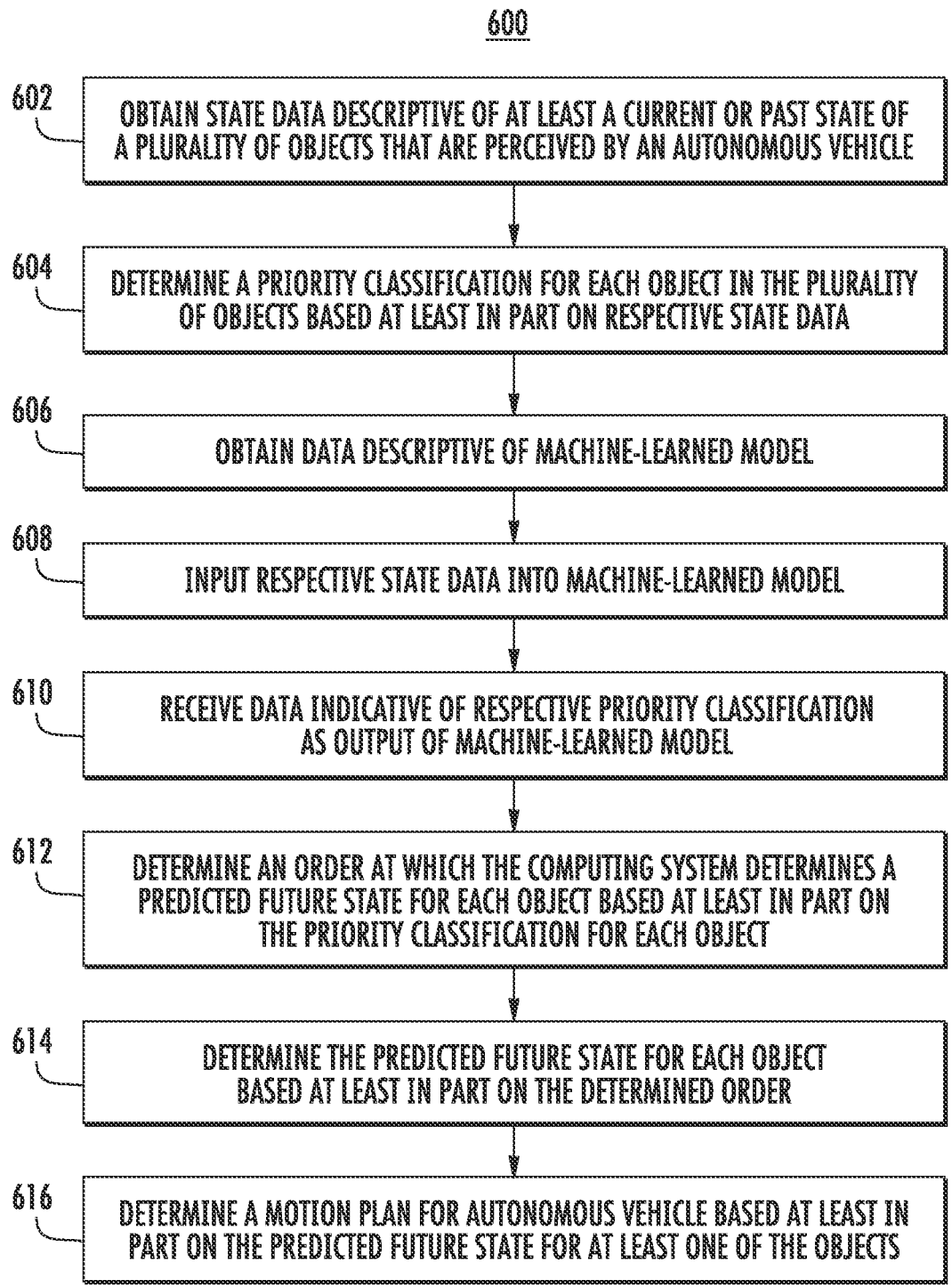
FIG. 6 depicts a flow chart diagram of an example method to determine a motion plan for an autonomous vehicle according to example aspects of the present disclosure.

Referring now to FIG. 6, an example method (600) to determine a predicted future state for objects perceived by an autonomous vehicle based at least in part on a priority classification for the objects according to example aspects of the present disclosure is depicted. Although FIG. 6 depicts steps performed in a particular order for purposes of illustration and discussion, the methods of the present disclosure are not limited to the particularly illustrated order or arrangement. The various steps of method (600) can be omitted, rearranged, combined, and/or adapted in various ways without deviating from the scope of the present disclosure. The method (600) can be implemented by a computing system, such as a computing system comprising one or more computing devices.

At (602), the method (600) can include obtaining, by a computing system, state data descriptive of at least a current or past state of a plurality of objects that are perceived by an autonomous vehicle. For example, the state data can include data descriptive of one or more features of an object, such as a position, a velocity, an acceleration, a heading, a yaw rate, a shape, a size, a type, a distance from the autonomous vehicle, a minimum path to interaction with the autonomous vehicle, a minimum time duration to interaction with the autonomous vehicle, any other state data described herein, or any state data descriptive of an object perceived by an autonomous vehicle. In some implementations, the state data can be obtained from a perception system of the autonomous vehicle configured to generate the state data based on sensor data obtained from one or more sensors of the autonomous vehicle.

At (604) the method (600) can include determining, by the computing system, a priority classification for each object in the plurality of objects based at least in part on the respective state data for each object. For example, in some implementations, the priority classification for each object can be determined by a priority classification system. In some implementations, the priority classification can be either a high-priority or low-priority classification for each object. In some implementations, the priority classification can be a respective priority rank for each object relative to each other object perceived by the autonomous vehicle.

In some implementations, the priority classification for each object can be determined by a machine-learned model. For example, at (606), the method can include obtaining data descriptive of a machine-learned model. In some implementations, data descriptive of the machine-learned model can be obtained from a memory (e.g., non-transitory computer readable media) of the computing system. In some implementations, the machine-learned model can be a machine-learned object priority classifier configured to classify each object as either high-priority or low-priority based on the respective state data for each object.

At (608), the method (600) can include inputting the respective state data for an object into the machine-learned model. For example, state data generated by a perception system can be received by a machine-learned model of a priority classification system. The respective state data for each object can be input into the machine-learned model in order to determine a priority classification for each respective object.

At (610), the method (600) can include receiving data indicative of a respective priority classification as an output of the machine-learned model. For example, in some implementations, the machine-learned model can be a machine-learned object priority classifier configured to classify each object as either high-priority or low-priority, and the machine-learned model can output a respective high-priority or low-priority classification based on the respective state data for each object.

At (612), the method (600) can include determining, by the computing system, an order at which the computing system determines a predicted future state for each object based at least in part on the priority classification for each object. For example, in some implementations, each object can be classified as either high-priority or low-priority, and the order can be determined such that each high-priority object has a predicted future state determined before a predicted future state is determined for any low-priority objects. In some implementations, determining an order at which the computing system determines a predicted future state for each object can be based on the priority rank assigned to each object. For example, the highest ranked object can have a predicted future state determined first, with each successive ranked object successively determined according to the respective priority rank for each object.

At (614), the method (600) can include determining, by the computing system, the predicted future state for each object based at least in part on the determined order. For example, in some implementations, the prediction system can determine an order in which a predicted future state for each object classified as high-priority before determining a predicted future state for each object classified as low-priority. In some implementations, as soon as the prediction system has determined a predicted future state for each object classified as high-priority, the prediction system can be configured to provide the predicted future states for each high-priority object to a motion planning system. In some implementations, determining a predicted future state for each object classified as high-priority can include determining a future state for each high-priority object based at least in part on state data obtained for the most recent time frame. In some implementations, determining a predicted future state for each object classified as low-priority can include determining a predicted future state for the object that was determined based on state data obtained for a previous sequential time frame. For example, in some implementations, the prediction system can provide a previously-determined future predicted state for each low-priority object for a previous sequential time frame to a motion planning system at the same time that the prediction system provides a future predicted state for each high-priority object for a current time frame to the motion planning system.

In some implementations, determining a predicted future state for each object based at least in part on the determined order can include selecting a future location prediction system at least in part on the priority classification for the object and determining the predicted future state for the object using the selected future location prediction system. For example, in some implementations, a prediction system can include a low-fidelity prediction system and a high-fidelity prediction system. In some implementations, the low-fidelity protection system can be used to determine a predicted future state for each low-priority object, and the high-fidelity prediction system can be used to determine a predicted future state for each high-priority object.

At (616), the method (600) can include determining a motion plan for the autonomous vehicle based at least in part on the predicted future state for at least one of the objects. For example, a motion planning system can receive one or more predicted future states for one or more objects perceived by the autonomous vehicle, and can determine a motion plan for the autonomous vehicle based at least in part on the predicted future states for the one or more objects.

In this way, the systems and methods according to example aspects of the present disclosure can allow for determining a priority classification for objects perceived by an autonomous vehicle, determining a predicted future state for each object based on the respective priority classification for each object, and determining a motion plan for the autonomous vehicle based at least in part on the predicted future states.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. An autonomous vehicle control system comprising:
   one or more processors; and
   one or more computer-readable medium storing instructions that when executed by the one or more processors cause the control system to perform operations, the operations comprising:
   obtaining state data descriptive of at least a current state or a past state of a plurality of objects that are detected by one or more sensors of an autonomous vehicle;
   determining a priority classification for a particular object relative to the plurality of objects based, at least in part, on respective state data for the particular object;
   determining a predicted future state for the particular object of the plurality of objects based, at least in part, on the priority classification for the particular object; and
   initiating a motion of the autonomous vehicle based, at least in part, on the predicted future state of the particular object.

2. The control system of claim 1, wherein determining the predicted future state for the particular object of the plurality of objects based, at least in part, on the priority classification for the particular object comprises:
   determining an order for determining a respective predicted future state for each of the plurality of objects based, at least in part, on the priority classification for the particular object; and
   determining the predicted future state for the particular object of the plurality of objects based, at least in part, on the order for determining the respective predicted future state for each of the plurality of objects.

3. The control system of claim 2, wherein determining the predicted future state for the particular object of the plurality of objects based, at least in part, on the order for determining the respective predicted future state for each of the plurality of objects, further comprises:

identifying one or more objects in a first priority category; and identifying one or more objects in a second priority category, wherein the order for determining the respective predicted future state for each of the plurality of objects is determined such that the respective predicted future state for the one or more objects in the first priority category are determined before the respective predicted future state for the one or more objects in the second priority category.

4. The control system of claim 3, wherein determining the predicted future state for the particular object of the plurality of objects based, at least in part, on the priority classification for the particular object, further comprises:

determining the respective predicted future state for each of the one or more objects in the first priority category based, at least in part, on current state data obtained for a current time frame.

5. The control system of claim 3, wherein determining the predicted future state for the particular object of the plurality of objects based, at least in part, on the priority classification for the particular object, comprises:

determining the respective predicted future state for each of the one or more objects in the second priority category based, at least in part, on past state data obtained at a previous time frame.

6. The control system of claim 3, wherein initiating the motion of the autonomous vehicle based, at least in part, on the predicted future state of the particular object, comprises:

determining a motion plan for the autonomous vehicle based, at least in part, on the predicted future state of the particular object, wherein the motion of the autonomous vehicle is based, at least in part, on the motion plan.

7. The control system of claim 3, wherein determining the predicted future state for the particular object of the plurality of objects based, at least in part, on the priority classification for the particular object, comprises:

identifying the respective predicted future state for each of the one or more objects in the first priority classification at a current time frame; and identifying the respective predicted future state for each of the one or more objects in the second priority classification at a subsequent time frame subsequent to the current time frame.

8. The control system of claim 3, wherein determining the predicted future state for the particular object of the plurality of objects based, at least in part, on the priority classification for the particular object, comprises:

selecting at least one future location prediction system of a plurality of future location prediction systems based, at least in part, on the priority classification for the particular object; and determining the predicted future state for the particular object using the at least one future location prediction system.

9. The control system of claim 8, wherein the plurality of future location prediction systems comprise a high-fidelity prediction system and a low-fidelity prediction system, wherein the high-fidelity prediction system can be associated with a higher computational intensity relative to the low-fidelity prediction system.

10. The control system of claim 9, wherein determining the predicted future state for the particular object of the plurality of objects based, at least in part, on the priority classification for the particular object, comprises:

determining the respective predicted future state for each of the one or more objects in the first priority category using the high-fidelity prediction system; and determining the respective predicted future state for each of the one or more objects in the second priority category using the low-fidelity prediction system.

11. The control system of claim 9, wherein the high-fidelity prediction system leverages one or more machine-learned models that predict a future location for a respective object, the one or more machine-learned models comprising a machine-learned goal-scoring model that is trained to generate and score one or more predicted goals for the respective object and a machine-learned trajectory development model that is trained to determine an object trajectory for at least one of the one or more predicted goals for the respective object, wherein the future location for the respective object is based, at least in part, on the object trajectory.

12. The control system of claim 9, wherein the low-fidelity prediction system leverages a state forward-integration model that predicts a future state for a respective object by forward integrating a respective current state for the respective object.

13. An autonomous vehicle comprising:

one or more processors; and one or more computer-readable medium storing instructions that when executed by the one or more processors cause the autonomous vehicle to perform operations, the operations comprising:

obtaining state data descriptive of at least a current state or a past state of a plurality of objects that are detected by one or more sensors of the autonomous vehicle;

determining a priority classification for particular object relative to the plurality of objects based, at least in part, on respective state data for the particular object;

determining a predicted future state for the particular object of the plurality of objects based, at least in part, on the priority classification for the particular object; and initiating a motion of the autonomous vehicle based, at least in part, on the predicted future state of the particular object.

14. The autonomous vehicle of claim 13, wherein the current state or the past state of the plurality of objects is indicative of (i) a distance from the autonomous vehicle, (ii) a minimum path to an interaction with the autonomous vehicle, or (iii) a minimum time duration to the interaction with the autonomous vehicle.

15. The autonomous vehicle of claim 14, wherein the priority classification is determined based, at least in part, on (i) the distance from the autonomous vehicle, (ii) the minimum path to the interaction with the autonomous vehicle, or (iii) the minimum time duration to the interaction with the autonomous vehicle.

16. The autonomous vehicle of claim 13, wherein the priority classification is determined based, at least in part, on a threshold velocity or a velocity range of the autonomous vehicle.

17. A computer-implemented method, comprising:

obtaining state data descriptive of at least a current state or a past state of a plurality of objects that are detected by one or more sensor of an autonomous vehicle;

determining a priority classification for a particular object relative to the plurality of objects based, at least in part, on respective state data for the particular object;

determining a predicted future state for the particular object of the plurality of objects based, at least in part, on the priority classification for the particular object; and initiating a motion of the autonomous vehicle based, at least in part, on the predicted future state of the particular object.

18. The computer-implemented method of claim 17, wherein determining the priority classification for the particular object relative to the plurality of objects based, at least in part, on the respective state data for the particular object comprises:

provicing the state data as an input to a machine-learned object classifier model; and receiving as an output of the machine-learned object classifier model, in response to receipt of the state data, a respective priority classification for each of the plurality of objects.

19. The computer-implemented method of claim 18, wherein the machine-learned object classifier model is trained based, at least in part, on training data previously collected during one or more previous autonomous vehicle driving sessions.

20. The computer-implemented method of claim 19, wherein the training data comprises previously recorded state data indicative of one or more previously perceived objects during the one or more previous autonomous vehicle driving sessions, wherein the training data comprises one or more object labels corresponding to the one or more previously perceived objects.

* * * * *